United States Patent [19]

Kawasaki

[11] Patent Number: 5,745,461
[45] Date of Patent: Apr. 28, 1998

[54] METHOD AND A SYSTEM OF OPTICAL DISK AUTO-DISCRIMINATION

[75] Inventor: Satoshi Kawasaki, Tokyo, Japan

[73] Assignee: NEC Corporation, Tokyo, Japan

[21] Appl. No.: 760,336

[22] Filed: Dec. 4, 1996

[30] Foreign Application Priority Data

Dec. 4, 1995 [JP] Japan ................. 7-315174

[51] Int. Cl.$^6$ ..................... G11B 7/00
[52] U.S. Cl. ............ 369/58; 369/54; 369/44.26; 369/44.29
[58] Field of Search ............... 369/58, 54, 94, 369/44.26, 44.31, 116, 44.25, 44.27, 44.29

[56] References Cited

U.S. PATENT DOCUMENTS

| 5,042,020 | 8/1991 | Endo ..................... 369/44.31 |
| 5,056,075 | 10/1991 | Maruta et al. ............. 369/58 |
| 5,235,581 | 8/1993 | Miyagawa et al. .......... 369/58 |
| 5,289,451 | 2/1994 | Ashinuma et al. .......... 369/54 |
| 5,381,392 | 1/1995 | Hira ..................... 369/54 |

FOREIGN PATENT DOCUMENTS 62-76061 4/1987 Japan .

Primary Examiner—Thang V. Tran
Attorney, Agent, or Firm—Sughrue, Mion, Zinn, Macpeak & Seas, PLLC

[57] ABSTRACT

For initializing and setting operation mode of devices automatically, an automatic type discrimination system of an optical disk mounted on a optical disk unit of the invention comprises: reflection measurement means (3) for measuring reflectivity (101) of back surface of the optical disk (1) provided on an opposite side of the optical disk (1) to an optical head (2); focus sum signal converting means (4) for outputting a level of a focus sum signal (102) during focus searching operation; tracking signal converting means (5) for outputting a peak to peak value of a tracking signal (103); and a microcomputer (6) for estimating material, layer number and recording density of the optical disk (1) by comparing the reflectivity (101), the level of the focus sum signal (102) and the peak to peak value of the tracking signal (103), with reference values prepared therein.

10 Claims, 4 Drawing Sheets

FIG.2

| DISK TYPE / MEASURED VALUE | DISK A | DISK B | DISK C | DISK D | DISK E |
|---|---|---|---|---|---|
| REFLECTIVITY | 30% | 30% | 30% | 60% | 60% |
| FOCUS SUM SIGNAL | 30 | 30 | 80 | 30 | 80 |
| TRACKING SIGNAL (pp) | 30 | 50 | 30 | 30 | 50 |

FIG.3

| DISK TYPE / MEASURED VALUE | DISK A | DISK B | DISK C | DISK D | DISK E |
|---|---|---|---|---|---|
| REFLECTIVITY | 10-30 | 10-30 | 10-30 | 70-90 | 70-90 |
| FOCUS SUM SIGNAL | 20-40 | 20-40 | 70-90 | 20-40 | 70-90 |
| TRACKING SIGNAL (pp) | 20-40 | 40-60 | 20-40 | 20-40 | 40-60 | a signal generating circuit 20 for generating a focus error signal 107, a tracking signal 103 and a reproduced signal 108 corresponding to a bit sequence recorded on the optical disk 1.

METHOD AND A SYSTEM OF OPTICAL DISK AUTO-DISCRIMINATION

BACKGROUND OF THE INVENTION

The present invention relates to reproducing and recording operation of an optical disk, and more particularly to a method and a system for automatic type discrimination of an optical disk mounted on an optical disk unit wherein different types of optical disks can be mounted.

In recent years, new types of optical disks, the digital video disks (DVD) for example, are being commercialized besides conventional type disks such as compact disks (CD) and laser disks (LD). Further, there are also developed devices for reproducing (and recording) multi-type disks, of which an example is a multi-disk-player which can reproduce both CD and LD.

As the diameters of CD (120 mm) and LD (300 mm) differ greatly with each other, these two types of disks can be easily distinguished at their installation. However, in case of disks having the same size, the mechanical discrimination of disk types is difficult. When disks are covered with cartridges, a mechanical distinction is still possible with help of a mark, a hole at a fixed position for instance, provided on the cartridges for the classification. Nevertheless, the DVD of present specification has the same diameter with the CD, and both of them are not protected with any cartridge, in order to retain compatibility with conventional CDs as well as to reduce a medium cost.

Therefore, a mechanical discrimination between these two disks is very difficult.

There have been proposed several methods for optically discriminating types of disks having the same size. For instance, in a Japanese patent application laid open as a provisional publication No. 76061/87, a reproduction unit for both of the ordinary CD and the write-once CD, having a structure as shown in FIG. 5, is disclosed, wherein signal level obtained from an optical head is measured for discriminating a disk type when an object lens is approaching near focal point in a focus searching operation.

In the prior art, an optical disk 1 is rotated by a disk motor 25. An optical head 2 is provided under the optical disk 1, so as to move freely in the radial direction of the optical disk 1. Signals obtained by the optical head 2 is transmitted to a signal generating circuit 20 for generating a focus error signal 107, a tracking signal 103 and a reproduced signal 108 corresponding to a bit sequence recorded on the optical disk 1.

Before signal reproduction of the optical disk 1 a focus servo procedure should be actuated. A focus OK signal generator 23 monitors signal level of the reproduced signal 108 obtained by the optical head 2 and transmitted through the signal generating circuit 20, while the object lens of the optical head 2 is driven to approach to a focal point. When the signal level of the reproduced signal 108 exceeds a predetermined value, in other words, when the object lens reaches near its focal point, a focus OK signal 110 is sent to a servo circuit 24. Then, the servo circuit 24 actuates its focus servo mechanism according to the focus error signal 107 output from the signal generating circuit 20. After the focus servo mechanism is actuated, a tracking signal 103 is output from the signal generating circuit 20, according to which the servo circuit 24 performs its tracking servo mechanism. Thus, the reproduced signal 108 modulated by signals recorded on tracks of the optical disk 1 is read out, which is error corrected and demodulated by a signal processor 22 to be output as an output signal 109.

At the same time when the object lens of the optical head 2 is exactly focussed by the focus servo mechanism, the reproduced signal 108 is also supplied to a discrimination circuit 21, where its signal level is measured. The discrimination circuit 21 determines type of the optical disk 1 according to the signal level of the reproduced signal 108 and arranges necessary parameters for inside setting, by generating a servo control signal 105 to control the servo circuit 24, for example.

Thus, an automatic discrimination of disk types is performed in the prior art between the ordinary CD and the write-once CD having different reflectivity.

However, various types of optical disks are being provided today for replying various demands of treating a huge amount of data such as digital video data, for example, on a personal computer, so that they are no more possible to be discriminated only by their reflectivity measured in a focussing procedure.

The DVD, well known among them, with information density of about four times compared to conventional optical disks, has reflectivity hardly different to that of the conventional optical disks. Besides the DVD, there is also proposed a double sided disk composed of two thin-type single sided disks stuck back to back, or a multi-layer optical disk having multi-recording-layers. Furthermore, in addition to read-only disks, disks able to be recorded should be taken in consideration such as photo-magnetic disks, phase change disks, or write-once optical disks with organic dye, and so on.

So a reliable device of automatic discrimination applacable for these various types of optical disks is expected.

SUMMARY OF THE INVENTION

Therefore, a primary object of the present invention is to provide a method and system of automatic discrimination of types of optical disks according to difference of their recording density, number and material of their recording layer, their disk thickness, i.e. either single sided, or double sided.

In order to achieve the object, a method of automatic type discrimination of an optical disk of the invention comprises:

a step of measuring reflectivity of a back surface of the optical disk mounted on the optical disk unit by reflection measurement means provided on an opposite side of the optical disk to an optical head;

a step of measuring a level of a focus sum signal indicating a sum of reflected light returned to said optical head performed during focus searching operation of said optical head;

a step of measuring a peak to peak value of a tracking signal output of said optical head performed after said focus searching operation; and a step of estimating material of a recording area, a layer number of said recording area and recording density of said optical disk by comparing said reflectivity, said level of said focus sum signal and said peak to peak value of said tracking signal with corresponding values of a reference table prepared in said microcomputer.

Thus, type of the optical disk can be estimated in the invention to be one among listed in the reference table.

For confirming the estimation, a method of automatic type discrimination of the invention may comprise a step of confirming a type of said optical disk by data obtained of said optical disk after a tracking servo mechanism of said optical head is actuated, said data being one of, ID data recorded on said optical disk;

a wobble signal detected in said tracking signal compared to a linear speed of said optical disk; and a synchronous signal included in a reproduced signal compared to said linear speed of said optical disk.

Further, it may comprise, for corresponding to double-sided disks, a step of an object lens selection of said optical head or a focal point selection of a double focus lens provided in said optical head performed according to said reflectivity.

Or, for corresponding to disks having different reflectivity, it may further comprise:

a step of controlling a laser power of said optical head according to a level of said focus sum signal measured after said focus searching operation;

a step of focus setting by actuating a focus servo mechanism of said optical head so that a maximum value of said peak to peak value of said tracking signal is obtained with said laser power controlled at said step of controlling a laser power; and a step of controlling tracking of said optical head by actuating tracking servo mechanism of said optical head according to said peak to peak value of said tracking signal measured after said step of focus setting.

DESCRIPTION OF THE DRAWINGS

The foregoing, further objects, features, and advantages of this invention will become apparent from a consideration of the following description, the appended claims, and the accompanying drawings following, in which the same numerals indicate the same or the corresponding parts.

FIG. 2 illustrates an example the reference table for the comparison prepared in a memory of the microcomputer 6 of FIG. 1.

FIG. 3 illustrates another example the reference table for the comparison prepared in a memory of the microcomputer 6 of FIG. 1.

DETAILED DESCRIPTION OF THE PREFERRED EMBODIMENTS

Figure 1:
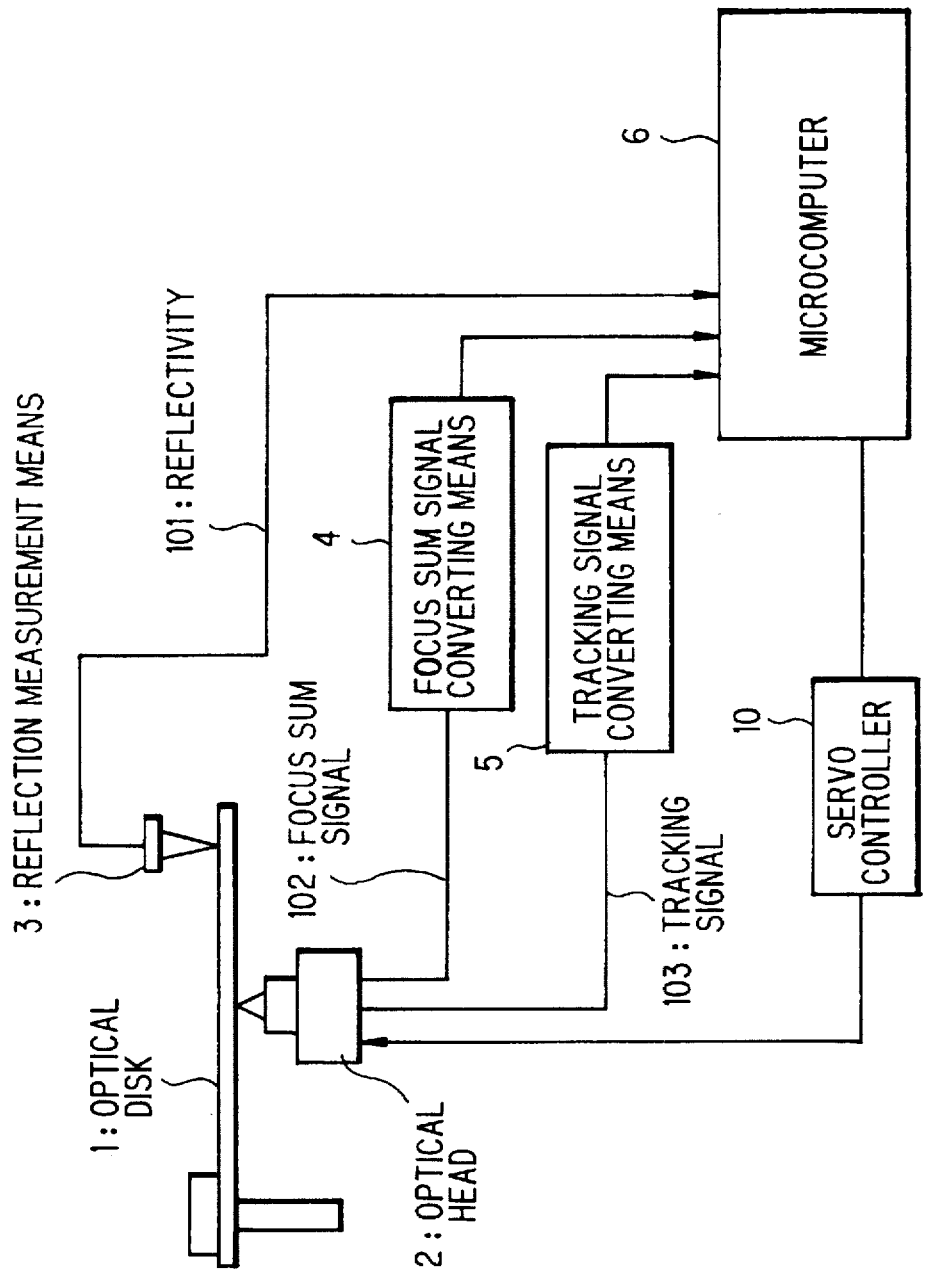
FIG. 1 is a block diagram illustrating an embodiment of the invention.

Now, referring to the drawings, embodiments of the present invention are described.

FIG. 1 is a block diagram illustrating an embodiment of the invention, wherein reflection measurement means 3 are provided on the opposite side to an optical head 2 of an optical disk 1 driven by a spindle motor. The reflection measurement means 3 measure reflectivity of back surface of the optical disk 1 with a photo-reflector element, for example. The measured reflectivity is output as reflectivity 101 of the disk surface to be supplied to a microcomputer 6.

On the other side, the optical head 2, irradiating a laser light and approaching to the optical disk 1 for a focus searching operation, outputs a focus sum signal 102, which is also supplied to the microcomputer 6 after converted into a voltage level, for example, through focus sum signal converting means 4. When the optical head 2 is detected by the focus sum signal 102 to have reached in a focal area, a focus servo mechanism is actuated and the optical head 2 is controlled through a servo controller 10. Then, after the focus servo mechanism is actuated, a tracking signal 103 output from the optical head 2 is also supplied to the microcomputer 6 after converted into a voltage level through tracking signal converting means 5.

The microcomputer 6 determines whether the optical disk 1 is single sided or double sided according to the reflectivity 101, estimates its information density, number and material of its recording layer(s) by comparing intensity level of the focus sum signal 102 and the peak to peak value of the tracking signal 103 with corresponding values in a reference table beforehand prepared in the microcomputer 6, and determines parameter values for initializing and mode-setting of concerning devices, actuating a tracking servo mechanism of the optical head 2 through the servo controller 10.

In case the optical disk 1 is assumed to have ID data recorded thereon from the above estimation, the ID data are tried to be read as the final confirmation before the initialization or the mode-setting. If, instead of the ID data, the optical disk 2 is estimated to have a wobble signal recorded on its track or to have a characteristic pattern of its synchronous signal in its reproduced signal, they are confirmed for the final discrimination.

FIG. 2 illustrates an example the reference table for the comparison prepared in a memory of the microcomputer 6. When the optical disk 1 is measured to have reflectivity 101 of 28%, a level of 32 of the focus sum signal 102 and a peak to peak value of 48 of the tracking signal 103, the optical disk 1 is estimated to be a disk B showing nearest values among disks A to E in FIG. 2. In each item of the reference table, a maximum and a minimum corresponding values may be prepared as shown in FIG. 3 for estimating disk type of the optical disk 1 by discriminating whether each value lies between each of them or not.

Figure 4:
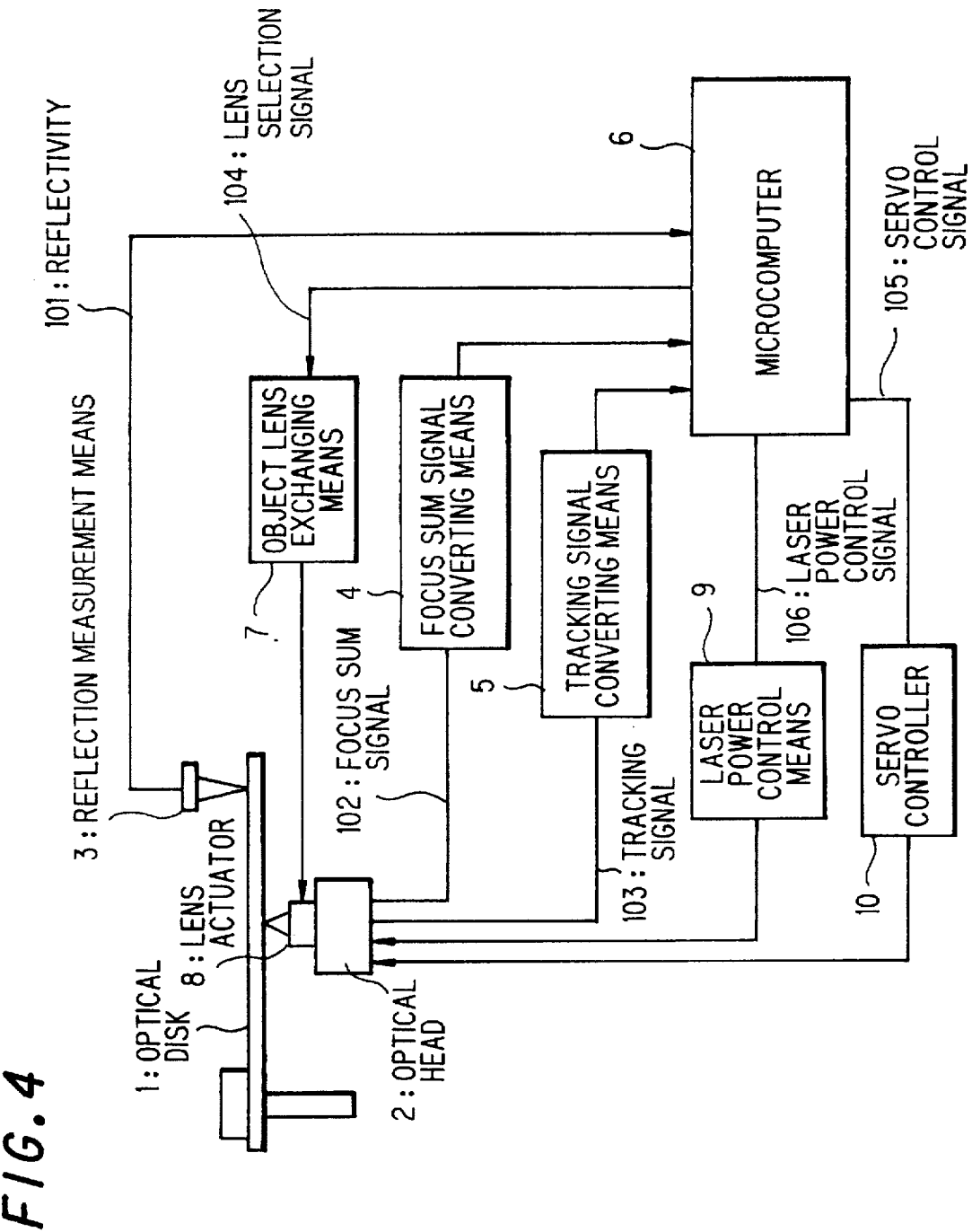
FIG. 4 is a block diagram illustrating another embodiment of the invention.
Figure 5:
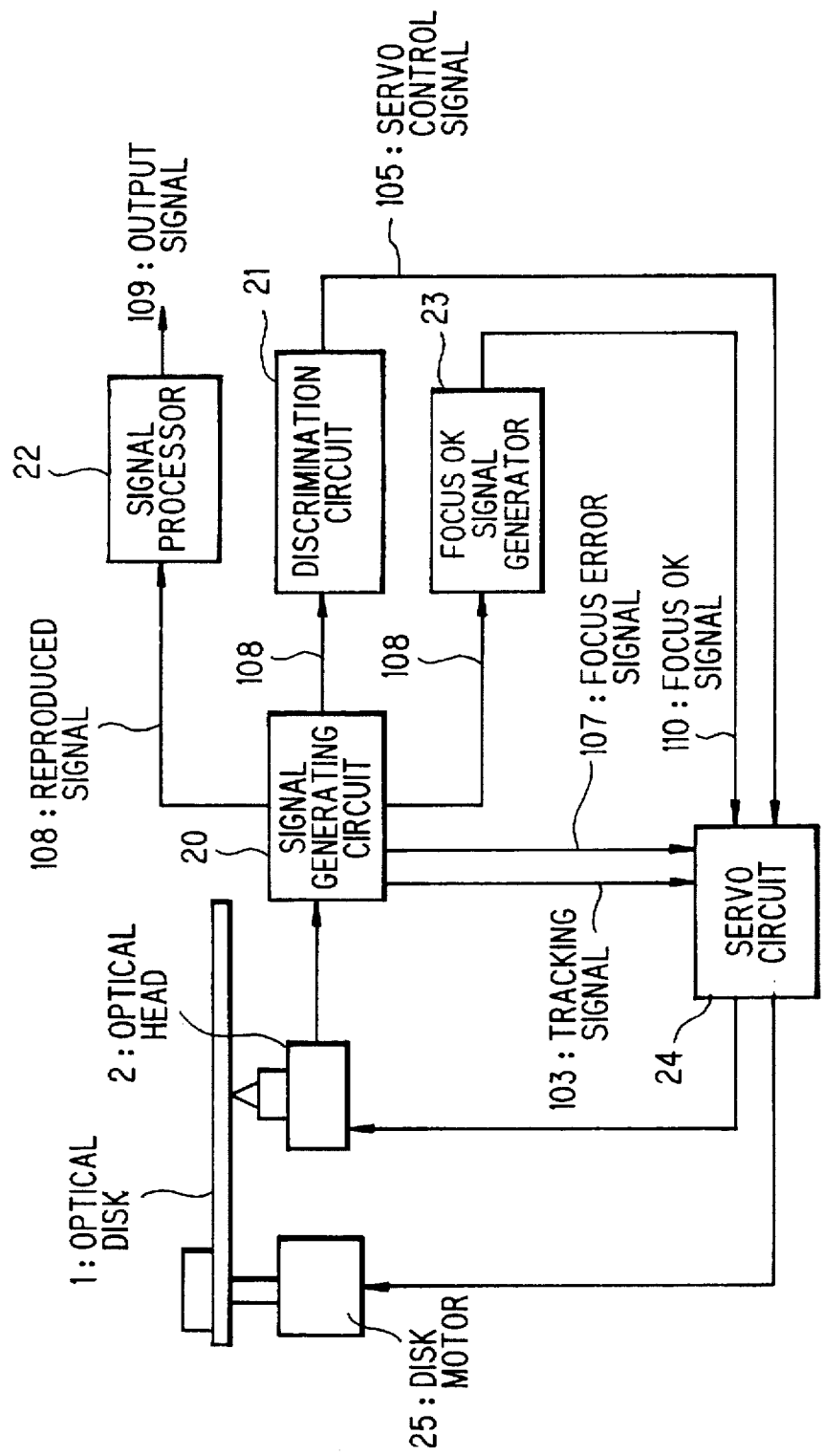
FIG. 5 is a block diagram illustrating a reproduction unit of a prior art for both of the ordinary CD and the write-once CD.

Now, another embodiment of the invention is described referring to FIG. 4, wherein are comprised object lens exchanging means 7, and laser power control means 9, besides the embodiment of FIG. 1. In the second embodiment of FIG. 4, the reflectivity 101, the focus sum signal 102 and the tracking signal 103 are also detected and supplied to the microcomputer 6 similarly to the embodiment of FIG. 1.

In the second embodiment, when the microcomputer detects whether the optical disk 1 is single sided or double sided from the reflectivity 101, a lens selection signal 104 is delivered to the object lens exchanging means 7, which make a lens actuator 8 to exchange the object lens to that designated by the lens selection signal 104.

The object lens is to be exchanged in cases as follows.

Generally, optical system in the optical head is designed to fit to thickness of disks to read. So, where disks of different thickness are possible to be mounted, means for exchanging its object lens or selecting a focal point of a multi-focus lens are better to be provided. Today, thin optical disks with 0.6 mm thickness have become used because of their higher margin against title angle of the laser light irradiated perpendicularly to their surface, in place of optical disks of 1.2 mm thickness heretofore mainly used. The thin optical disks are generally used double sided stuck back to back, for enhancing their mechanical characteristic such as that against disk surface oscillation. In the case, object lens is better exchanged according to the disk thickness, which can be estimated by detecting whether the optical disk 1 is double sided or not, referring to the reflectivity 101.

Besides the difference of disk thickness, there are disks having an optical characteristic certainly different from others so that the servo mechanism can not work as well with the same parameters when these disks are mounted as in case of other disks. In these cases, it is preferable to actuate the servo mechanism, which works referring to the focus sum signal 102 and the tracking signal 103, after resetting the laser light intensity as well as the servo parameters in the servo control means 10. For the purpose, the laser power control means 9 are provided here.

In the embodiment, level of the focus sum signal 102 is measured for the first in the focus search operation and a laser power control signal 106 is generated according to the measured result to be delivered to the laser power control means 9 for adjusting the laser power intensity to give an appropriate reflection light. Then, a servo control signal 105 is transmitted to the servo control means 10 to perform the focus adjustment by the focus servo mechanism. The peak to peak value of the tracking signal 103 is measured after the focus adjustment.

Comparing data thus obtained with the reference table prepared in the microcomputer 6, type of the optical disk 1 is determined in the embodiment.

Thus, an automatic discrimination of various types of optical disks can be performed in the invention according to their recording materials, number of recording layer(s), information density and whether they are double sided or not, which is confirmed by the ID data, the wobble signal or the synchronous signal thereof, enabling automatic initialization and mode-setting of concerning devices.

What is claimed is:

1. A method of automatic type discrimination of an optical disk mounted on an optical disk unit; comprising:

a step of measuring reflectivity of a back surface of the optical disk mounted on the optical disk unit by reflection measurement means provided on an opposite side of the optical disk to an optical head;

a step of measuring a level of a focus sum signal indicating a sum of reflected light returned to said optical head performed during focus searching operation of said optical head;

a step of measuring a peak to peak value of a tracking signal output of said optical head performed after said focus searching operation; and a step of estimating material of a recording area, a layer number of said recording area and recording density of said optical disk by comparing said reflectivity, said level of said focus sum signal and said peak to peak value of said tracking signal with corresponding values of a reference table prepared in a microcomputer.

2. A method of automatic type discrimination of an optical disk recited in claim 1; further comprising:

a step of confirming a type of said optical disk by data obtained of said optical disk after a tracking servo mechanism of said optical head is actuated.

3. A method of automatic type discrimination of an optical disk recited in claim 1; wherein said step of measuring a level of a focus sum signal and said step of measuring a peak to peak value of a tracking signal are performed after an object lens selection of said optical head is performed according to said reflectivity.

4. A method of automatic type discrimination of an optical disk recited in claim 1; wherein said step of measuring a level of a focus sum signal and said step of measuring a peak to peak value of a tracking signal are performed after a focal point selection of a double focus lens provided in said optical head is performed according to said reflectivity.

5. A method of automatic type discrimination of an optical disk recited in claim 1; further comprising:

a step of controlling a laser power of said optical head according to a level of said focus sum signal measured after said focus searching operation;

a step of focus setting by actuating a focus servo mechanism of said optical head so that a maximum value of said peak to peak value of said tracking signal is obtained with said laser power controlled at said step of controlling a laser power; and a step of controlling tracking of said optical head by actuating tracking servo mechanism of said optical head according to said peak to peak value of said tracking signal measured after said step of focus setting.

6. A system for automatic type discrimination of an optical disk mounted on an optical disk unit; comprising:

reflection measurement means for measuring reflectivity of a back surface of the optical disk mounted on the optical disk unit provided on an opposite side of the optical disk to an optical head;

focus sum signal converting means for outputting a level of a focus sum signal indicating a sum of reflected light returned to said optical head during focus searching operation of said optical head;

tracking signal converting means for outputting a peak to peak value of a tracking signal output of said optical head after said focus searching operation; and a microcomputer for estimating material of a recording area, a layer number of said recording area and recording density of said optical disk by comparing said reflectivity, said level of said focus sum signal and said peak to peak value of said tracking signal with corresponding values of a reference table prepared therein, and confirming a type of said optical disk by data obtained of said optical disk after a tracking servo mechanism of said optical head is actuated.

7. A system for automatic type discrimination of an optical disk recited in claim 6; further comprising:

object lens exchanging means for selecting an object lens when more than one object lens is provided in said optical head and selecting a focal point when a double focus lens is provided in said optical head, according to a lens selection signal generated by said microcomputer referring to said reflectivity.

8. A system for automatic type discrimination of an optical disk recited in claim 6; further comprising:

laser power control means for controlling a laser power of said optical head according to a level of said focus sum signal measured after said focus searching operation.

9. A system for automatic type discrimination of an optical disk recited in claim 6; wherein said data for confirming a type of said optical disk are:

ID data recorded on said optical disk when said ID data are able to be extracted;

a wobble signal detected in said tracking signal compared to a linear speed of said optical disk when said wobble signal is able to be extracted; and a synchronous signal included in a reproduced signal compared to said linear speed of said optical disk when said synchronous signal is able to be extracted.

10. A system for automatic type discrimination of an optical disk recited in claim 6; wherein said data for confirming a type of said optical disk are one of:

ID data recorded on said optical disk;

a wobble signal detected in said tracking signal compared to a linear speed of said optical disk; and a synchronous signal included in a reproduced signal compared to said linear speed of said optical disk.

* * * * *